Jan. 30, 1962 J. A. RAJCHMAN 3,019,418

MAGNETIC MEMORY SYSTEMS USING TRANSFLUXORS

Filed April 2, 1957 3 Sheets-Sheet 1

INVENTOR.
Jan A. Rajchman
BY Morris A. Rabkin
ATTORNEY.

MAGNETIC MEMORY SYSTEMS USING TRANSFLUXORS

Filed April 2, 1957 3 Sheets-Sheet 2

INVENTOR.
Jan A. Rajchman
BY
Morris [signature]
ATTORNEY.

MAGNETIC MEMORY SYSTEMS USING TRANSFLUXORS

Filed April 2, 1957

INVENTOR.
Jan A. Rajchman
BY
Morris A. Rabkin
ATTORNEY.

United States Patent Office 3,019,418

Patented Jan. 30, 1962

3,019,418

MAGNETIC MEMORY SYSTEMS USING TRANSFLUXORS

Jan A. Rajchman, Princeton, N.J., assignor to Radio Corporation of America, a corporation of Delaware Filed Apr. 2, 1957, Ser. No. 650,154
15 Claims. (Cl. 340—174)

This invention relates to magnetic memory systems, and particularly, to memory systems using transfluxors.

An article by J. A. Rajchman and A. W. Lo, entitled "The Transfluxor," and published in the March 1956 issue of the Proceedings of the IRE, pages 321–332, describes the construction and the operation of transfluxor devices. The transfluxor includes a core of rectangular hysteresis loop magnetic material having two or more apertures.

An important factor in the operation of rectangular hysteresis loop materials in multi-coordinate selection systems is the so-called switching time. By switching time is meant the time required to change the material between its two remanent states, using an optimum value of applied magnetizing force. It is found that the switching time is approximately inversely proportional to the amplitude of the applied magnetizing force. In memory systems using simple coincident-current selection techniques, there is an upper limit to the operating speed because of the inherent switching time of the magnetic material. The upper speed limit occurs because the amplitude of the magnetizing force applied to non-selected magnetic memory elements is made less than the coercive force of the magnetic material in order to prevent undesired flux changes in non-selected elements.

It is among the objects of the present invention to provide improved magnetic memory systems using transfluxors.

Another object of the invention is to provide improved magnetic memory systems using transfluxors which systems retain the advantages of transfluxors, and which can be operated at a higher speed than the prior memory systems using simple coincident-current techniques.

Still another object of the invention is to provide improved memory systems using transfluxors which systems can be operated at a relatively higher speed, and in which the coupling between different windings of non-selected ones of the transfluxors is substantially decreased.

A further object of the present invention is to provide improved memory systems whose maximum operating speed is not limited by the magnetic material used in making the elements.

Memory systems according to the present invention use one or more transfluxors each having at least three apertures. A setting and an output aperture are each located adjacent a blocking aperture. The aperture walls define four legs of which a pair are setting legs and the other pair are output legs. One leg of the setting pair is biased in an initial direction of magnetization. A flux path, including the biased setting leg and one of the output legs, is provided in the transfluxor. Selecting magnetizing forces are applied along the flux path in a direction to produce a flux reversal in the one setting leg and in an output leg. Relatively intense, short-duration selecting currents can be applied through the setting aperture without producing any undesired flux changes in the transfluxor.

After the momentary setting signals are terminated, the bias produced by an inhibit current reverses the flux along another flux path including both legs of the setting pair. Thereafter, the setting windings and an output winding linked through the output aperture are substantially decoupled from each other. A blocking signal applied through the central aperture returns each of the legs to the initial direction of magnetization.

A feature of the invention is that desired portions of the flux in the one output leg can be changed in accordance with amplitude modulated setting signals.

Figure 7:
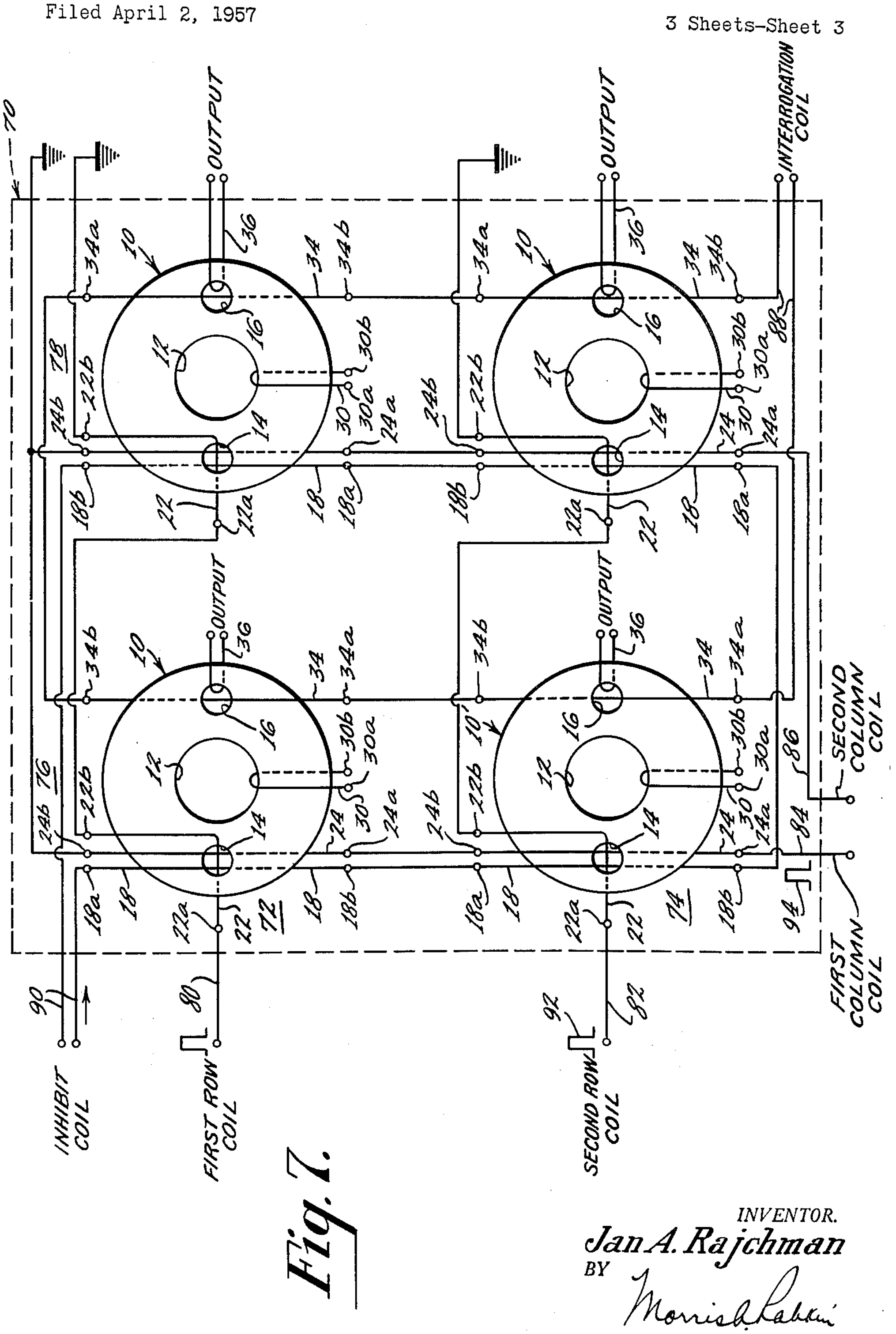

FIGS. 3 through 6, respectively, are each a schematic diagram of a transfluxor core illustrating flux changes therein during various portions of the operating cycle; and FIG. 7 is a schematic diagram of a two-dimensional memory system according to the invention.

Figure 1:
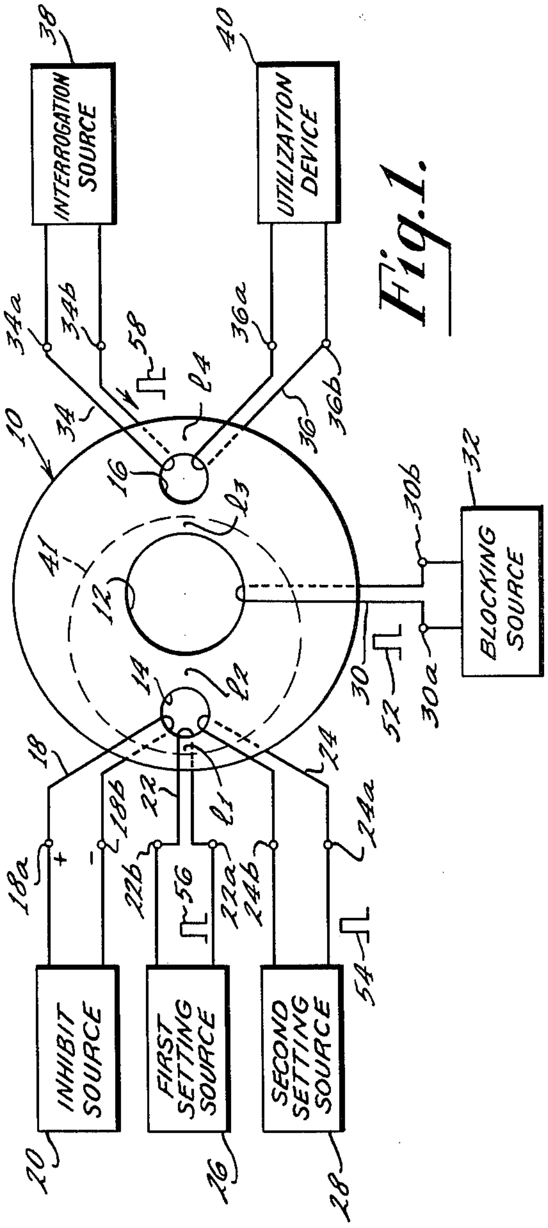
FIG. 1 is a schematic diagram of a memory system, according to the invention, using a three-apertured transfluxor core.

The transfluxor core 10 of FIG. 1 is similar to the transfluxor core shown in FIG. 17 of the aforementioned article by Rajchman and Lo, and has a central aperture 12, a setting aperture 14, and an output aperture 16 located on either side of the central aperture 12. The three apertures of the core 10 provide a pair of setting legs $l_1$ and $l_2$, and a pair of output legs $l_3$ and $l_4$. Each of the legs $l_1$, $l_2$, $l_3$ and $l_4$ is of equal cross-sectional area. The transfluxor 10 may be one element of a coincident-current memory system, described more fully hereinafter.

An inhibit winding 18 is threaded through the setting aperture 14. Beginning at one terminal 18*a*, the inhibit winding 18 is brought across the top surface of the core 10, then through the setting aperture 14, and then across the bottom surface of the core 10 to the other terminal 18*b*. The inhibit winding 18 is connected to an inhibit source 20, adapted to apply a D.C. (direct current) to the inhibit winding 18 in a direction of conventional flow from the terminal 18*a* to the terminal 18*b*. A pair of setting windings 22 and 24 are each threaded through the setting aperture 14. Beginning at the terminal 22*a*, the first setting winding 22 is brought across the bottom surface of the core 10, then through the setting aperture 14, and then across the top surface of the core 10 to the other terminal 22*b*. A second setting winding 24 is similarly threaded through the setting aperture 14. The setting windings 22 and 24 are connected to first and second setting sources 26 and 28, respectively.

A blocking winding 30 is threaded through the central aperture 12 of the core 10. Beginning at one terminal 30*a*, the blocking winding 30 is brought across the top surface of the core 10, then through the central aperture 12, and then across the bottom surface of the core 10 to the other terminal 30*b*. The terminals of the blocking winding 30 are connected to a blocking pulse source 32. An interrogation winding 34 and an output winding 36 are each threaded through the output aperture 16 of the core 10. Beginning at one terminal 34*a*, the interrogation winding 34 is brought across the top surface of the core 10, then through the output aperture 16 and then across the bottom surface of the core 10 to the other terminal 34*b*. The terminals of the interrogation winding 34 are connected to an interrogation source 38. The output winding 36 is threaded through the output aperture 16 in a manner similar to the interrogation winding 34. The terminals of the output winding 36 are connected to a utilization device 40.

The first and second setting sources 26 and 28 may be any suitable sources, preferably constant-current sources such as, for example, magnetic core or pentode tube amplifier circuits, adapted for applying setting pulses to the setting windings 22 and 24, respectively. The first and second setting sources may be synchronized by any suitable means, for example, the control portion of a digital computer system. The interrogation source 38 may be any suitable source for supplying A.C. (alternating current) pulses to the interrogation winding 34. The output device 40 may be any suitable device responsive to the output signals produced in the output winding 36 when the interrogation signals are applied to the core 10.

Figure 2:
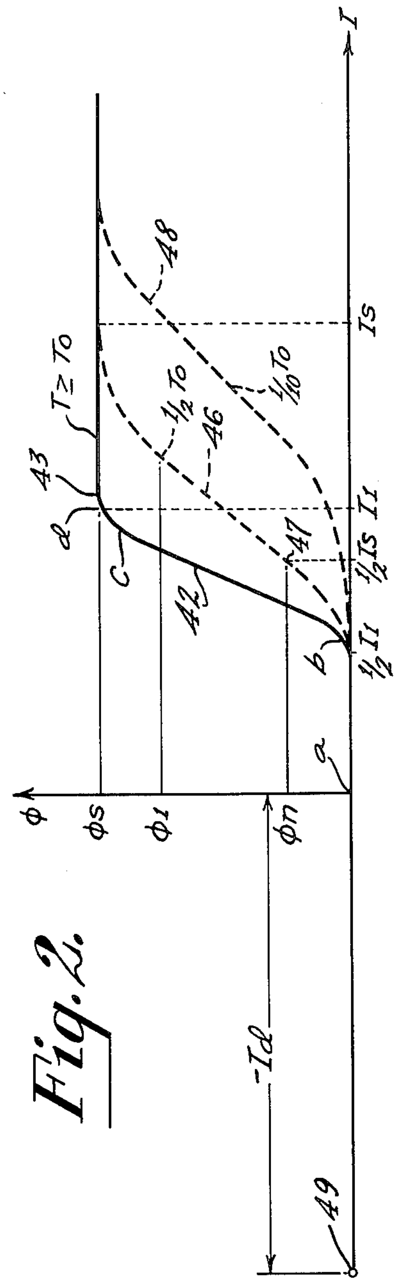
FIG. 2 is a graph of a family of curves showing various values of flux for different amplitudes and durations of applied setting signals in the memory system of FIG. 1.

The graph of FIG. 2 illustrates the response characteristics of a core 10 for various amplitude and various duration setting pulses. The ordinate of FIG. 2 is measured in arbitrary units of flux set into the output leg $1_3$, of the core 10. The flux change in the output leg $1_3$ is produced by a setting current applied through the setting aperture 14. The flux change in the leg $1_3$ may be ascertained by integrating the voltage induced in a winding (not shown) wound on the leg $1_3$ as a result of the application of setting signals through the setting aperture 12. The abscissa of the graph of FIG. 2 is divided into arbitrary units of current applied through the setting aperture 12.

The upper, solid curve 42 represents a magnetization curve of the flux vs. current characteristics taken for different setting pulse amplitudes using relatively long-duration setting signals. It is found that setting pulses of amplitudes varying from pulse to pulse, and equal to or greater than a duration $T_0$, produce substantially the same magnetization curve as the curve 42. The time $T_0$ substantially corresponds to the switching time for the particular rectangular hysteresis material used in fabricating the core 10. The switching time $T_0$ is the time interval between the two 10% points on the switching voltage waveform of the core material using magnetizing forces approximately equal to 3/2 the coercive force of the core material. The switching time $T_0$ can be obtained from data furnished by the core manufacturer. Between the points *a* and *b* of the lower horizontal portion of the curve 42, the setting pulses are each of an amplitude that produces a magnetizing force less than the coercive force required to produce a flux change along the dotted path 41 (FIG. 1) including the legs $1_1$ and $1_3$ of the core 10. The amplitudes of the setting pulses between those corresponding to the points *b* and *c* of the curve 42 of FIG. 2 are such that, for each setting pulse, the resultant magnetizing force produces a flux change along the path 41 of FIG. 1. The flux change along the path 41 varies approximately linearly with the increasing setting pulse amplitude. For setting pulse amplitudes corresponding to those between the points *c* and *d* of the curve 42, the total flux change along the path 41, resulting from any single setting pulse, remains about the same. This flux change for any single setting pulse approaches asymptotically a value which may be equal to the saturation value $\phi s$ for increasing larger setting pulse amplitudes.

Note that a setting pulse of a duration equal to, or greater than, $T_0$, and of an amplitude $I_1$, produces a substantially complete flux reversal in the legs $1_1$ and $1_3$ of the core 10 of FIG. 1. Thus, referring to FIG. 2, the longer-duration setting pulse current of amplitude $I_1$ produces a substantially complete reversal of flux in the legs $1_1$ and $1_3$ of an amount substantially equal to $\phi s$, corresponding to the point 43 of the curve 42. Also note that a longer-duration setting current of amplitude 1/2 $I_1$ produces substantially no flux change in the core 10.

The middle dotted curve 46 shows the flux vs. current characteristics along the path 41 of the core 10 for other setting pulses of the same amplitudes as the setting pulses used in plotting the solid curve 42, but of a duration 1/2 $T_0$. Observe that, for a given flux change $\phi l$ along the path 41, a relatively larger amplitude of the shorter-duration setting pulses is required. For substantially complete flux reversal in the legs $1_1$ and $1_3$ which produces the flux change $\phi s$, setting pulses of duration 1/2 $T_0$ and of amplitude $Is$ (greater than $I_1$) are applied. Observe that shorter-duration setting currents of 1/2 $Is$ produce an undesired flux change $\phi n$ in the legs $1_1$ and $1_3$, as indicated by the point 47 of the curve 46. It is found experimentally that the incremental flux change $\phi n$ is cumulative and repeated applications of the short-duration setting pulses of amplitude $Is/2$ eventually produces a substantially complete flux reversal in the legs $1_1$ and $1_3$.

The lowest dotted curve 48 of FIG. 2 shows the flux vs. current characteristics 41 of the core 10 for still shorter-duration setting pulses of a duration 1/10 $T_0$ Note that the dotted curve 48 slopes still further than the middle curve 46, and still greater amplitudes of setting currents are required to produce corresponding flux changes in the legs $1_1$ and $1_3$ than when longer-duration setting pulses are applied. Accordingly, if simple coincident current selection were used in the system of FIG. 1, then the duration of the setting pulses and, consequently, the speed of operation of the system, is limited because of the cumulative undesired flux changes in the core 10.

An inhibit current of amplitude $Id$ applied to the inhibit winding 18 applies a bias to the leg $1_1$ and, consequently, biases the path 41, in a direction to prevent setting signals from changing flux along the path 41. The inhibit current bias is represented by the point 49 located, to the left of the origin, on the abscissa of FIG. 2. Observe that a single setting current of amplitude $Id$ is prevented from producing any flux change along the path 41 by the inhibit bias. However, a pair of setting currents, each of amplitude $Id$, produces a substantially complete flux reversal along the path 41, even when their durations are many times shorter than the duration $T_0$. Accordingly, the additional bias applied along the path 41 permits the memory system of FIG. 1 to be operated at any desired speed. The amplitude of the bias current is adjusted for operation with the particular system in which the invention is used.

Referring again to FIG. 1, the core 10 is placed in its blocked condition by operating the blocking pulse source to apply a positive blocking pulse 52 to the blocking winding 30. The flux pattern in the core 10, after a blocking pulse is applied, is illustrated qualitatively by arrows, FIG. 3. Thus, the flux in each of the legs $1_1$, $1_2$, $1_3$ and $1_4$ is oriented in an initial clockwise sense, with reference to the central aperture 12. Note that the D.C. bias current flowing in the inhibit winding 18 is not in a direction to produce any flux change in the core 10 in the blocked condition. The bias current does not produce a flux change because the setting leg $1_1$ is already saturated with flux in the sense in which the bias current tends to change flux. Accordingly, the bias current, no matter what its amplitude, does not produce any flux change in the core 10 when the core 10 is in its blocked condition.

Figure 4:
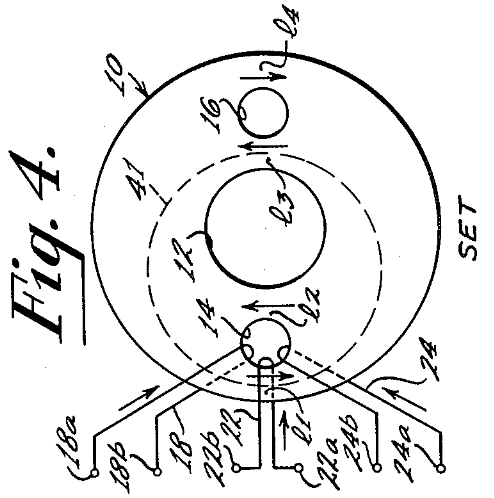
Figure 3:
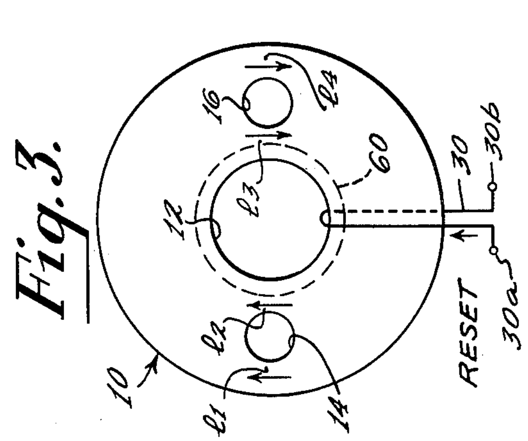
Figure 6:
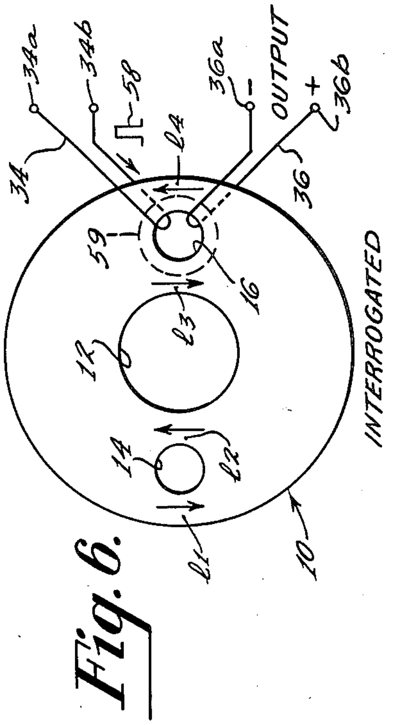

Assume, now, that a pair of positive setting pulses 54 and 56 are applied concurrently to the first and second setting windings 22 and 24 by the setting sources 26 and 28, respectively. The setting pulses are each of amplitude $Id$, equal to the D.C. bias, and of a duration less than the time $T_0$. These setting pulses together produce a flux change in the legs $1_1$ and $1_3$ of the core 10 along a path indicated by the dotted path 41. The flux pattern produced in the core 10 by the pair of setting pulses is illustrated in FIG. 4.

Figure 5:
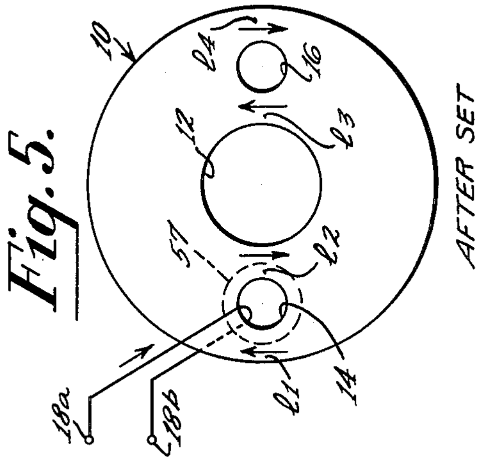

After the pair of setting pulses 54 and 56 are terminated, the bias current produces a flux change in the setting legs $1_1$ and $1_2$ along a path indicated by the dotted line 57 (FIG. 5). The latter flux change returns the setting leg $1_1$ to its initial blocked direction of magnetization. Thus, as described hereinafter, the setting windings 22 and 24 do not have any voltage produced therein when the core 10 is later returned to its blocked condition. Accordingly, the setting windings 22 and 24 are decoupled from the other core 10 windings after the flux reversal is carried out in the setting legs $1_1$ and $1_2$.

The flux change in the output leg $1_3$ represents the information read into, or stored in, the core 10 during the setting operation. This stored information may be in digital form wherein an appreciable flux change in the output leg $1_3$, during the setting operation, may be used to represent one binary digit, for example, a binary 1 digit. A lack of an appreciable flux change in the output leg $l_3$ is used to represent the complement of the one binary digit, for example, a binary 0 digit. Also, the information stored in the output leg $l_3$ may be in analog form, as described hereinafter.

The information stored in the output leg $l_3$ can be determined by applying a positive read pulse 58 to the interrogation winding 34. The read pulse 58 produces a flux reversal in the output legs $l_3$ and $l_4$, along a path indicated by the dotted line 59 of FIG. 6.

The flux change in the output legs $l_3$ and $l_4$ induces an output voltage across the output winding 36 also linked to the path 59. The amplitude of the induced output voltage represents the stored information. One binary digit is represented by a relatively large induced output voltage; the complement of the one binary digit is represented by a relatively small induced voltage. A relatively small voltage is induced in the output winding 36 when both the output legs are in their initial blocked conditions.

A succeeding negative-polarity read pulse applied to the interrogation winding 34 by the interrogation source 38 produces another flux reversal in the output legs $l_3$ and $l_4$, and another output signal is produced in the output winding 36. An indefinite number of read-outs of the stored information, as desired, can be obtained by applying an indefinite number of positive and negative read pulses to the interrogation winding 34.

The core 10 can be returned to its blocked condition by applying a new blocking pulse 52 to the blocking winding 30, after any one of the positive read pulses 58. The blocking pulse 52 changes the flux in the legs $l_2$ and $l_3$ to the initial clockwise sense, with reference to the blocking aperture 12. The blocking pulse 52 changes the flux in the core 10 along a path, such as the path indicated by the dotted line 60 of FIG. 3. Observe that the blocking pulse 52 does not produce any flux reversals in the legs $l_1$ and $l_4$. Accordingly, during the blocking operation, none of the windings coupled to the legs $l_1$ and $l_4$ has any appreciable voltage induced therein.

The setting of the output leg $l_3$ can be controlled by analog-type setting signals by regulating one setting current amplitude to have a value equal to the inhibit amplitude I*d*. For example, assume that the first setting pulse 56 is of amplitude I*d*. Accordingly, the first setting pulse 56 effectively cancels the bias applied along the path 41 by the inhibit current of amplitude I*d*. The amplitude of the second setting pulse 54 then controls the amount of flux set into the output leg $l_3$. The second setting pulse amplitude can be regulated so that the flux change in the output leg $l_3$ can be varied throughout a range, including two extreme values. One extreme value includes the amplitude at which the second setting pulse just equals the coercive force of the path 41, including the legs $l_1$ and $l_3$. The other extreme value includes the amplitude at which the second setting pulse substantially reverses all the flux in the output leg $l_3$. Thus, by modulating the amplitude of the setting pulses, a corresponding amount of flux is set into the output leg $l_3$. Corresponding amplitude modulated output signals are induced in the output winding 36 when the core 10 is interrogated.

In the two-dimensional memory system 70 of FIG. 8, four of the cores 10 are arranged in two rows 72, 74, and two columns 76, 78. A first row coil 80 is formed by connecting the two first setting windings 22 of the upper row of cores 10 in series with each other. The terminal **22*b* of one first setting winding 22 is connected to the terminal 22*a* of a succeeding first setting winding 22. A second row coil 82 is formed in similar manner by connecting the two first setting windings 22 of the lower cores 10 in series with each other. First and second column coils 84 and 86 also are formed in similar manner by connecting the two second setting windings 24 of the first and second columns of cores 10, respectively, in series with each other. An interrogation coil 88 is formed by connecting all the interrogation windings 34 in series with each other. One terminal 34*b* of an interrogation winding 34 is connected to the terminal 34*a* of a succeeding interrogation winding 34. Each of the cores 10 has a separate output winding 36 threaded through its output aperture 16. A common inhibit coil 90 is formed by connecting all the inhibit windings 18 in series with each other; the terminal 18*b* of one inhibit winding 18 is connected to the terminal 18*a* of a succeeding inhibit winding 18**.

A separate blocking winding 30 is threaded through the blocking aperture of each separate core 10. If desired, all the blocking windings 30 can be connected in series with each other to form a common blocking coil (not shown).

Information is written into a selected core 10 by applying a setting pulse to the one-row coil and the one-column coil intersecting in the selected core 10. For example, the core 10′ at the intersection of the second row 74 and the first column 76 is selected by applying a positive setting pulse 92 to the second row coil 82 and concurrently applying a positive setting pulse 94 to the first column coil 84. The selected core 10′ is thereby changed from its initial, blocked condition to a set condition. The information stored in the selected core 10′ can be determined non-destructively by applying a sequence of a positive pulse 96 and a negative pulse 98 to the interrogation coil 88. The information previously stored in the selected core 10′ is represented by the output produced in the output winding 36 of the core 10′. Any other desired core 10 can be selected in similar fashion.

If separate, blocking windings 18 are used, the same decoding circuitry used in selecting a core 10 for receiving information can be used for selecting a blocking winding 18 of a desired core 10 to change the desired core 10 to its blocked condition.

In the case of a common blocking coil (not shown), all the cores 10 are returned to their blocked conditions at the same time by a single blocking pulse applied to the common blocking coil. An arrangement using a common blocking coil may be useful, for example, in applications where an array of cores 10 is scanned, with each different core 10 receiving a different information signal. Such scanning can be achieved, for example, by applying a relatively long-duration setting signal to the first row coil 80. Each of the column coils are activated by a separate, second setting signal. The separate second setting signals may be applied to the common coils concurrently or sequentially. In such case, the setting signal applied to the first row coil 80 primes the cores 10 of the first row 72 to respond to the separate setting signals applied to the separate column coils. The column coil signals are prevented from producing flux changes in any cores 10, other than the first row 72, by the inhibit signal. After the last core 10 of the first row is activated, the setting signal is removed from the first row coil. The inhibit current then produces a flux change in the setting legs $l_1$ and $l_2$ of the cores 10 of the first row that received setting signals on their column coils. The next row of cores 10 is then enabled by a long-duration setting pulse applied to its row coil. The inhibit current applied to the inhibit coil 90 prevents the information stored in the first row of cores 10 from being disturbed when a succeeding row of cores 10 is receiving information signals.

There have been described herein improved memory systems using transfluxors which can be operated at relatively high speeds. The operating speed of the systems of the invention are not limited by the inherent switching characteristics of the core material. Both digital and analog-type information signals can be stored.

The present invention includes arrays of transfluxors arranged in coordinate groupings, for example, the two-dimensional array of FIG. 8. Other known arrays of memory elements may be employed, if desired. A plurality of blocking coils (not shown) can be linked in combinatorial fashion through the blocking apertures 12 of the arrayed cores 10. In such case, a particular core 10 is changed to its blocked condition by applying a particular group of signals to the combinations of blocking windings.

What is claimed is:

1. A memory system comprising a core of substantially rectangular hysteresis loop material having three apertures, the aperture walls defining four legs of which a pair are setting legs and the other pair are output legs, means for biasing one of said setting legs to saturation in an initial direction of magnetization, a first flux path including said one setting leg and an output leg, means for applying a momentary magnetizing force along said first flux path in a direction to produce a flux reversal therein from said initial direction to the other direction of magnetization, and another flux path including both said setting legs, said bias means producing a flux reversal in said other path each time a flux reversal is produced in said first path.

2. A memory system comprising a core of substantially rectangular hysteresis loop material having three apertures, the aperture walls defining four legs of which a pair are setting legs and the other pair are output legs, bias means for biasing one of said setting legs to saturation in an initial direction of magnetization, a first flux path including said one setting leg and one of said output legs, a second flux path including both said setting legs, and means for applying a plurality of separate momentary magnetizing forces along said first path in a direction to produce a flux reversal therealong, said bias means operating to produce a subsequent flux reversal along said second path each time a flux reversal is produced along said first path by said selecting magnetizing forces.

3. A memory system as characterized in claim 2, and further characterized in that a given number of said separate selecting magnetizing forces is required to be applied before any flux reversal is carried out along said first path.

4. A memory system as recited in claim 2, including a third flux path including the other of said setting legs and said one output leg, and means for applying a magnetizing force to produce a flux reversal along said third path.

5. A memory system comprising a plurality of cores of substantially rectangular hysteresis loop material arranged in coordinate groupings, each of said cores having three apertures, said apertured walls defining four separate legs in each said core of which one pair are setting legs and the other pair are output legs, means for biasing one setting leg of all said cores to saturation in an initial direction of magnetization, each of said cores having a separate flux path including said one setting leg and one of said output legs, a first plurality of selecting coils each linking said one path of a different first group of said cores, and a second plurality of selecting coils each linking said one path of another and different second group of said cores, each different pair of said first and second different groups of said cores having one core in common and other cores not in common.

6. A memory system as claimed in claim 5, said cores being arranged in rows and columns, separate ones of said first plurality of selecting coils being linked to separate rows of said cores, and separate ones of said second plurality of selecting coils being linked to separate columns of said cores.

7. A memory system comprising a core of substantially rectangular hysteresis loop material having three apertures, the aperture walls defining four legs of which a pair are setting legs and the other pair are output legs, means for biasing one of said setting legs in an initial direction of magnetization, a first flux path including said one setting leg and an output leg, means for applying a magnetizing force along said first path to produce a flux reversal in said one setting leg and one of said output legs, said biasing means producing a flux reversal in both said setting legs upon the removal of said first path magnetizing force, another flux path including both said output legs, means for applying other magnetizing forces along said other path, and means for deriving output signals corresponding to flux changes produced along said other path by said magnetizing forces.

8. A memory system as claimed in claim 7, wherein said bias means includes a winding threaded through a first of said apertures, and said means for applying a magnetizing force along said first path includes one or more selecting windings threaded through said first aperture.

9. A memory system as claimed in claim 7, wherein said bias means includes a winding threaded through a first of said apertures, said means for applying said other magnetizing forces along said other path includes an interrogation winding threaded through a second of said apertures, and said means for deriving output signals includes an output winding threaded through said second aperture.

10. A memory system comprising a core of substantially rectangular hysteresis loop material having a relatively central aperture and two other apertures located in said material between said central aperture and the periphery of said core, an inhibit winding threading a first of said other apertures, means for applying a bias-current to said inhibit winding in a direction to maintain the portion of material located between the wall of said first aperture and the periphery of said core saturated with flux in an initial direction of magnetization, a selecting winding threading said first aperture, and means for applying a selecting current to said selecting winding to produce a flux change in said portion of material from said initial to the other direction of magnetization.

11. A memory system as claimed in claim 10, and including an interrogation and an output winding each threading the second of said other apertures.

12. A memory system as claimed in claim 10, including an interrogation winding and an output winding each threading the second of said other apertures, and a blocking winding threading said central aperture.

13. A memory system comprising a plurality of cores of substantially rectangular hysteresis loop material, said cores each having three apertures, including a relatively central aperture and two outer apertures, a common bias coil threaded through a first outer aperture of all said cores for applying a bias magnetizing force in a direction to maintain a portion of the material adjacent a first aperture of each said core saturated with flux in an initial direction of magnetization, a first plurality of selecting coils each threading the first apertures of a different group of said cores, a second plurality of selecting coils each threading the first apertures of another different group of said cores, said different and said other different groups of cores having certain of said cores in common and others not in common, means for writing information into a desired one of said cores comprising means for applying separate selecting signals to the one selecting coil of said different group and the one selecting coil of said other different group threading said desired core, a common interrogation winding linking the second outer aperture of all said cores, a plurality of output coils each threading the second outer aperture of an individual one of said cores, and means for reading the information stored in a desired one of said cores comprising means for applying an interrogation signal to said interrogation coil, said output coil of said desired core having a signal produced therein corresponding to the information stored in said desired core.

14. In a magnetic memory system, a core of substantially rectangular hysteresis loop material having three apertures therein, an inhibit winding wound in one sense through a first of said apertures, a plurality of setting windings wound in the sense opposite the one sense through said first aperture, a blocking winding wound through a second of said apertures for producing a magnetic flux in one sense in each of said legs, means for applying a bias current to said inhibit winding, said bias current, when applied, operating to maintain one of said legs adjacent said first aperture in said initial sense, and means for applying setting signals to said setting windings, said setting signals, when applied to a predetermined number of said setting windings, operating to overcome said bias current to produce a flux change in said one leg and in another leg adjacent the third of said apertures from said initial to the other sense, and said bias current further operating to produce a flux reversal in said one leg and in another leg adjacent said first aperture when said setting signals are removed from said setting windings.

15. A memory system comprising a core of rectangular hysteresis loop material having three apertures, said apertures defining a pair of setting legs and a pair of output legs, a flux path including one of said setting legs and one of said output legs, means for applying a bias to said one setting leg in a direction to bias said one setting leg to saturation in an initial direction of magnetization, a plurality of setting windings linked to said path, means for applying setting signals to said setting windings, said bias preventing a flux reversal along said one path when less than a given number of said setting signals are applied, and another flux path including both said setting legs, said bias means producing a flux reversal along said other path each time a flux reversal is produced along said first-mentioned path and after said setting signals are removed from said setting windings.

References Cited in the file of this patent

UNITED STATES PATENTS

| | | |
|---|---|---|
| 2,719,965 | Person | Oct. 4, 1955 |
| 2,734,184 | Rajchman | Feb. 7, 1956 |
| 2,802,953 | Arsenault | Aug. 13, 1957 |
| 2,818,555 | Lo | Dec. 31, 1957 |
| 2,818,556 | Lo | Dec. 31, 1957 |
| 2,923,923 | Raker | Feb. 2, 1960 |